United States Patent
Gorham et al.

(10) Patent No.: US 7,077,799 B2
(45) Date of Patent: Jul. 18, 2006

(54) APPARATUS AND METHOD FOR A HIGH-EFFICIENCY SELF-CLEANING CENTRIFUGE HAVING CONCENTRATE CYLINDERS

(75) Inventors: Adelbert Gorham, Burnsville, MN (US); Denis J. Dudrey, Bloomington, MN (US); James N. Gehrking, Burnsville, MN (US); Ronald L. Jorgenson, Apple Valley, MN (US); David S. Paulson, Elko, MN (US); Rodger I. Spears, Bloomington, MN (US); Lloyd E. Weisert, Bloomington, MN (US)

(73) Assignee: Advanced Products Laboratories, Inc., Burnsville, MN (US)

( * ) Notice: Subject to any disclaimer, the term of this patent is extended or adjusted under 35 U.S.C. 154(b) by 187 days.

(21) Appl. No.: 10/724,432

(22) Filed: Nov. 28, 2003

(65) Prior Publication Data

US 2004/0112824 A1  Jun. 17, 2004

Related U.S. Application Data

(60) Provisional application No. 60/433,525, filed on Dec. 16, 2002.

(51) Int. Cl.
*B04B 1/06* (2006.01)
*B04B 11/05* (2006.01)

(52) U.S. Cl. ............................. 494/37; 494/52; 494/77; 494/84

(58) Field of Classification Search ............ 494/50–52, 494/76–78; 210/360.1, 380.1, 374
See application file for complete search history.

(56) References Cited

U.S. PATENT DOCUMENTS

| 866,844 | A | * | 9/1907 | Cottrell | 494/77 |
|---|---|---|---|---|---|
| 1,048,846 | A | * | 12/1912 | Mattern | 494/52 |
| 2,450,737 | A | * | 10/1948 | Rundquist | 494/12 |
| 3,858,793 | A | | 1/1975 | Dudrey | |
| 3,861,584 | A | | 1/1975 | Dudrey | |

(Continued)

FOREIGN PATENT DOCUMENTS

WO  88/04950  * 7/1988

OTHER PUBLICATIONS

"New Bowl Centrifuge Design Cuts Metalworking Coolant Costs", K. Riesberg & D. Dudrey; Filtration Engeering, May/Jun. 1972 (6 pages).

*Primary Examiner*—Charles E. Cooley
(74) *Attorney, Agent, or Firm*—Charles A. Lemaire; Lemaire Patent Law Firm, P.L.L.C.

(57) ABSTRACT

A self-cleaning centrifuge for clarifying contaminated liquids has a rotor assembly comprising nested first and second sets of concentric cylinders supported for rotation about an axis. The sets of concentric cylinders are rotatably connected. A motor is connected to rotate one of the sets. Contaminated liquid is supplied to the nested cylinders, and the liquid provides coupling between both of the sets so that both sets rotate about the axis. Centrifugal force causes foreign matter to collect on the circumferential surfaces of the cylinders. The resultant clarified liquid is collected for reuse. A selectively utilized brake provides sudden braking of one of the rotating sets to purge collected foreign matter from the cylinders. The purged foreign matter is collected for disposal.

22 Claims, 9 Drawing Sheets

U.S. PATENT DOCUMENTS

| | | | |
|---|---|---|---|
| 4,030,897 A | * 6/1977 | Pelzer et al. | ............... 494/13 |
| 4,350,282 A | 9/1982 | Dudrey et al. | |
| 4,406,651 A | 9/1983 | Dudrey et al. | |
| 5,344,382 A | * 9/1994 | Pelzer | ............... 494/77 |
| 5,935,053 A | * 8/1999 | Strid et al. | |
| 6,056,685 A | * 5/2000 | Nelson | ............... 494/65 |

\* cited by examiner

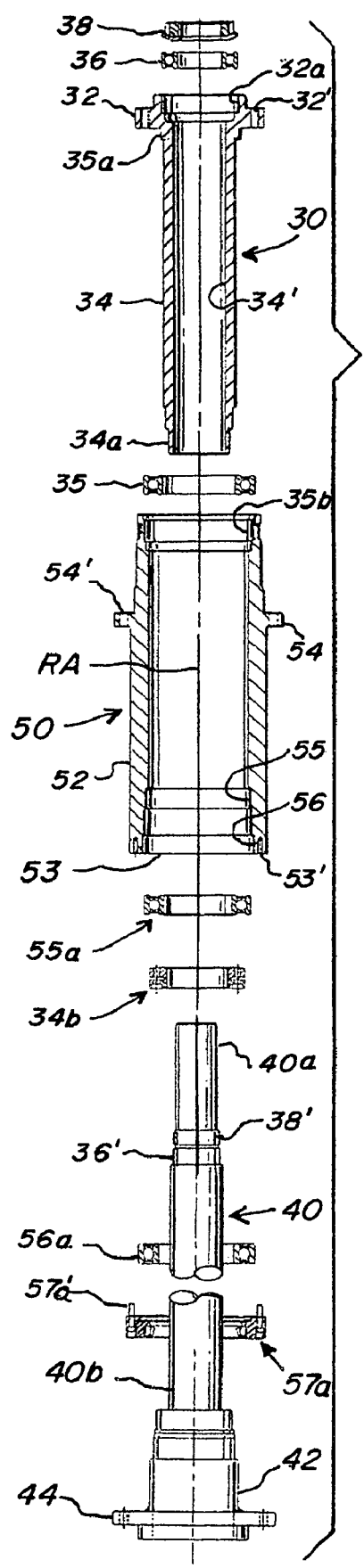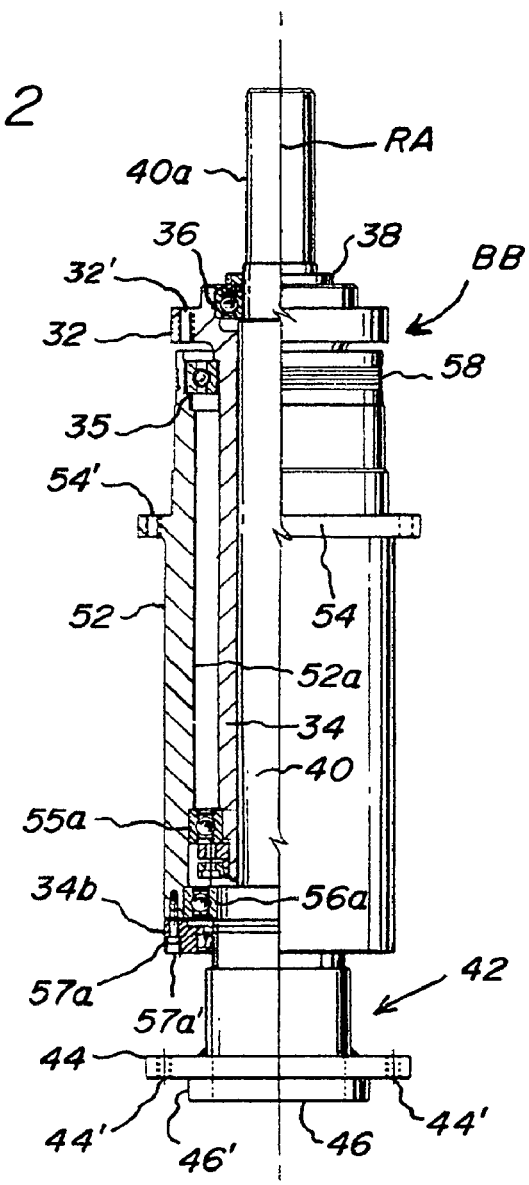

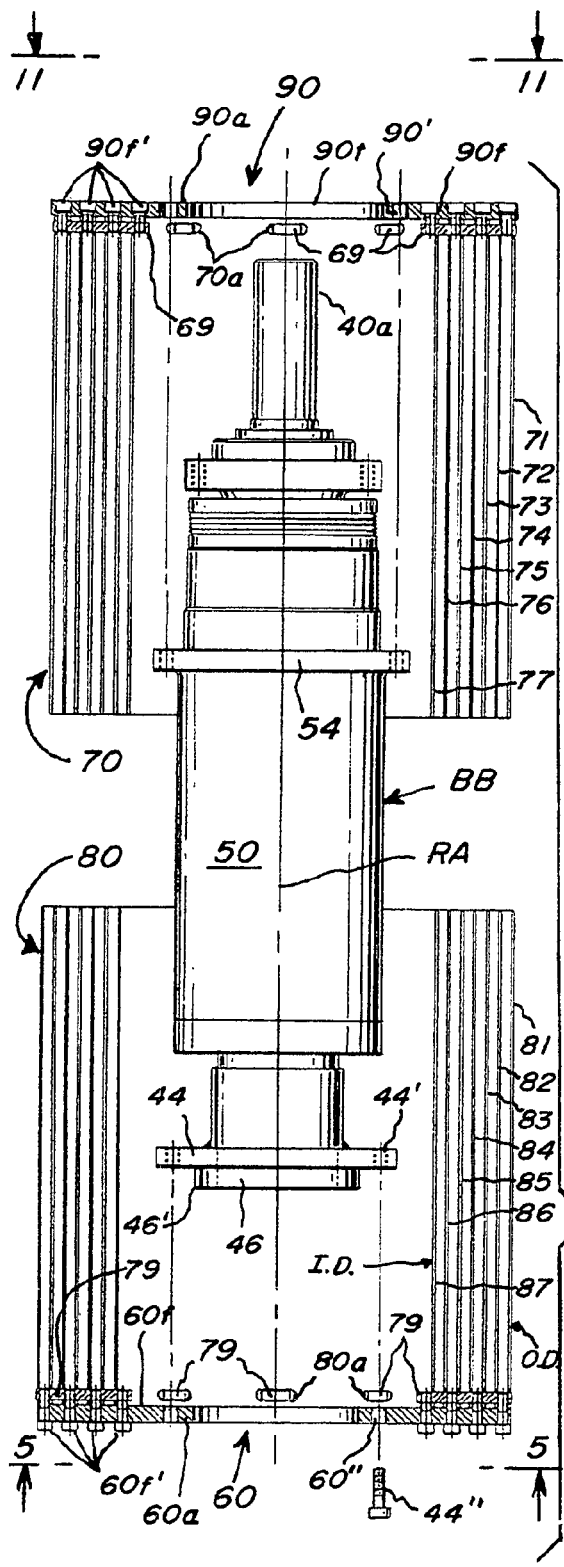
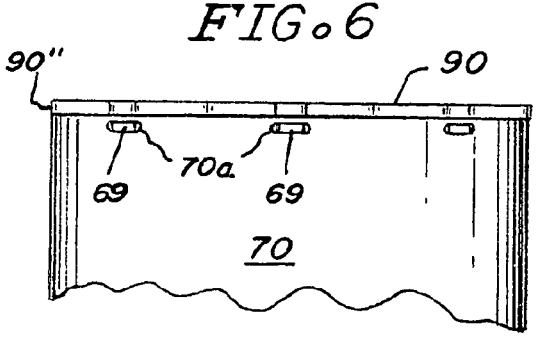
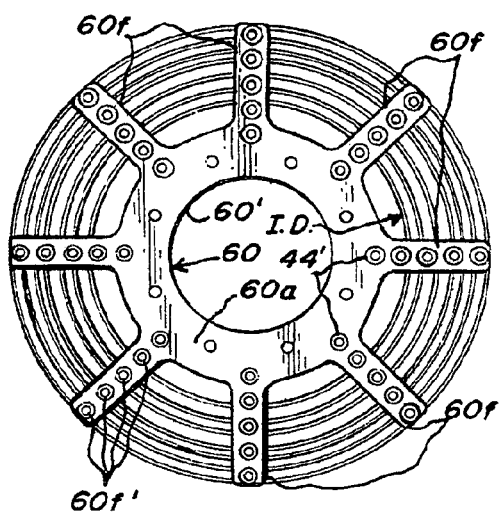

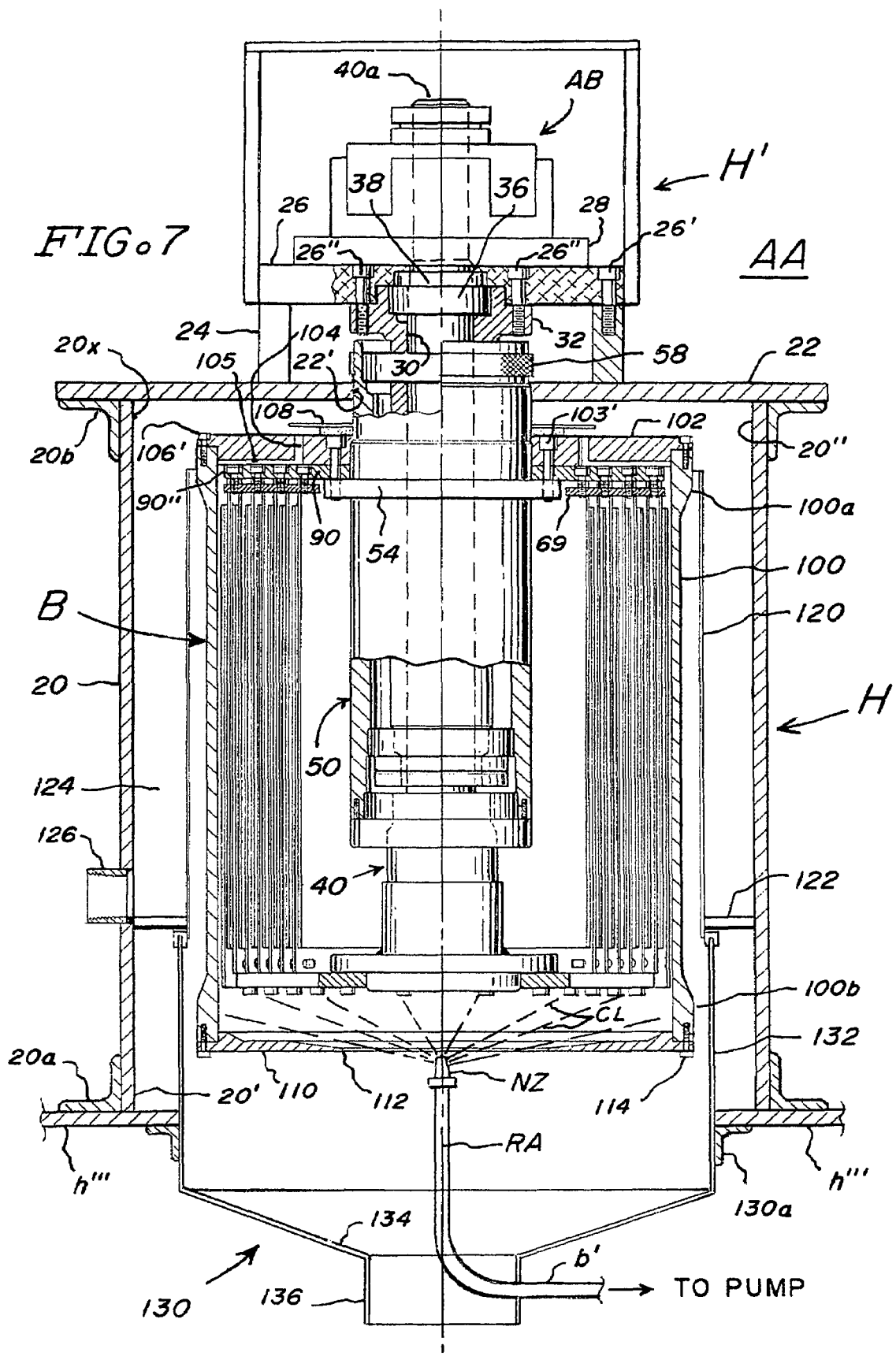

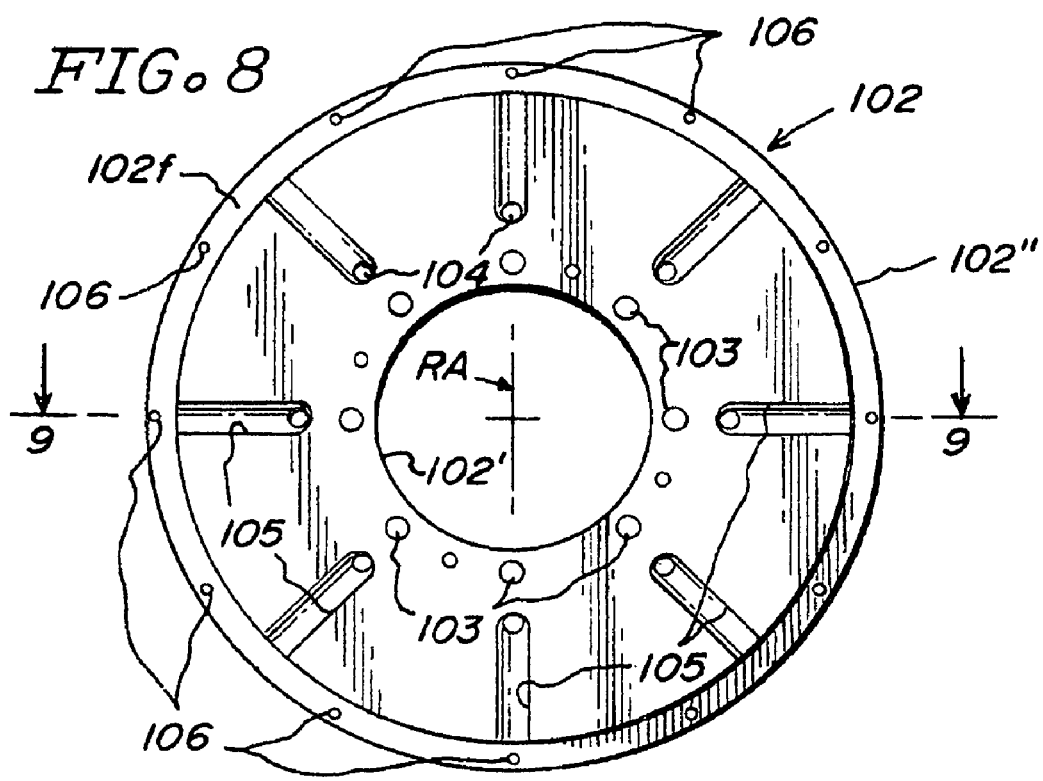
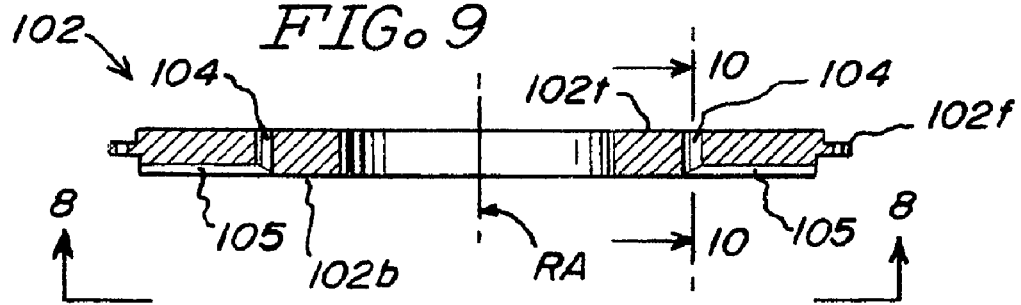
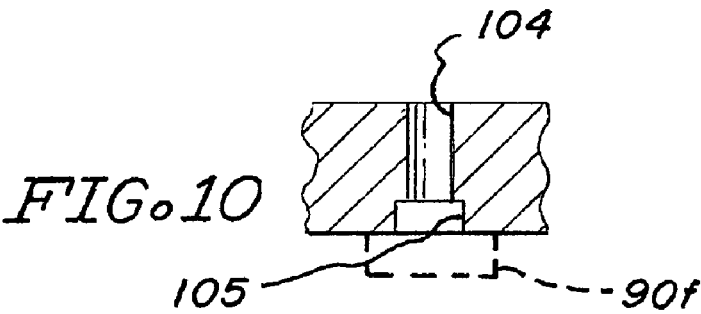

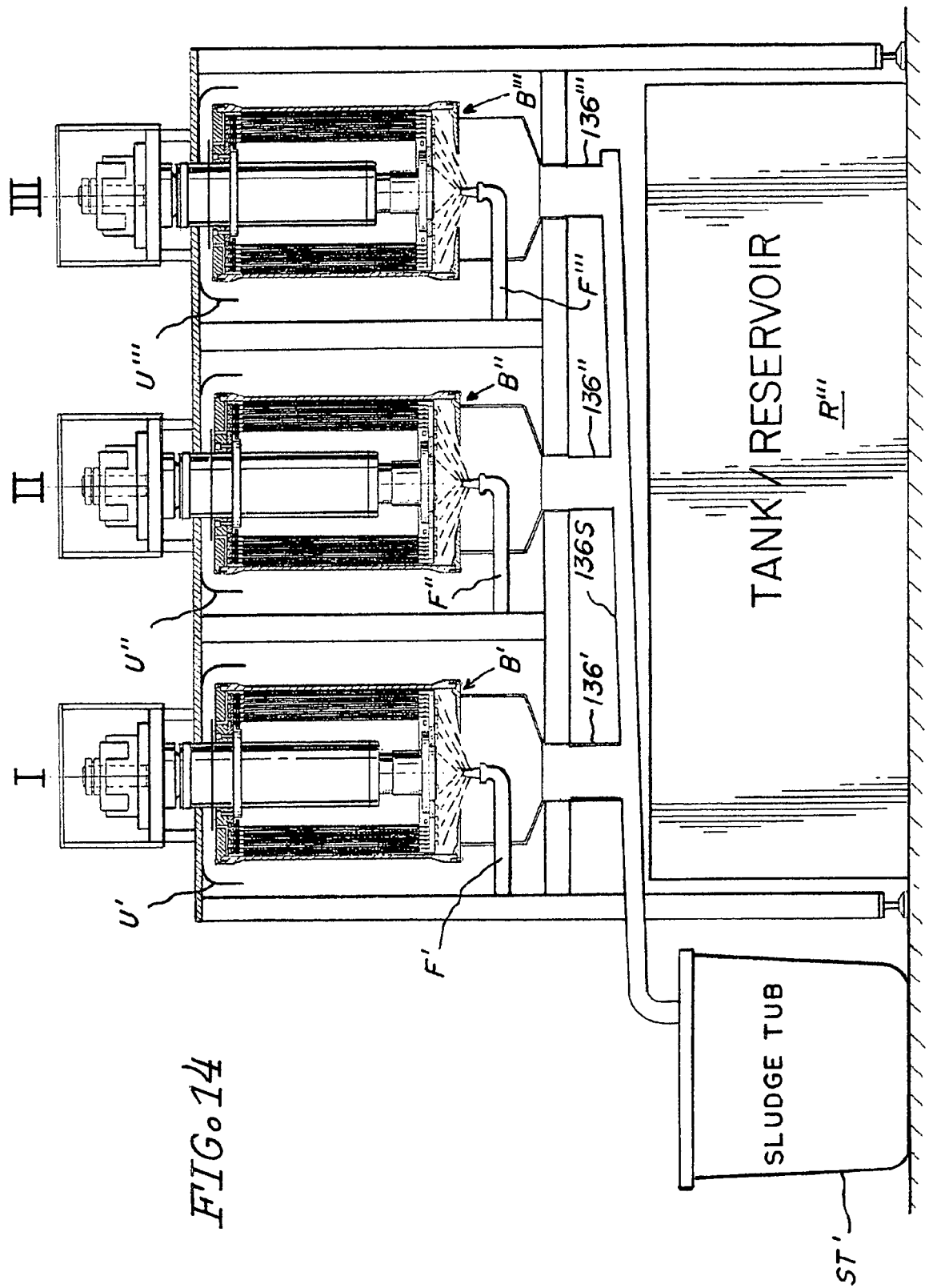

APPARATUS AND METHOD FOR A HIGH-EFFICIENCY SELF-CLEANING CENTRIFUGE HAVING CONCENTRATE CYLINDERS

PRIOR PROVISIONAL APPLICATION

This application is based on our prior U.S. Provisional Patent Application No. 60/433,525, filed Dec. 16, 2002, the disclosure of which is incorporated herein.

BACKGROUND OF THE INVENTION

Centrifuges are widely used for clarifying contaminated liquids, a common example being liquids used for cooling or flushing the "work area" of operational machine tools such as grinders, lathes, milling machines, thread rollers, etc.

Wire Electrical Discharge Machines (Wire EDM(s)) are machine tools in widespread use for precision metal cutting but present a special challenge because they require relatively large volumes of cutting liquids of high clarity while generating large volumes of metal particles which must be carried away by the cutting liquid. More specifically, high clarity de-ionized water is required for Wire EDM machining because this process utilizes a high voltage applied across a small gap to produce arcing between the metal piece being machined and a moving brass wire. The de-ionized water washes away particles (of both the metal piece and the wire) generated in the cutting process. If the de-ionizing is degraded, then the increased conductivity of the water will interfere with the arcing and significantly reduce the speed and accuracy of the cutting process. Advanced Wire EDM machines can generate up to ten pounds of steel particles in one hundred hours of coarse cutting of a steel work piece and an equal amount of brass particles from the moving EDM wire.

Wire EDM also produce particles that are difficult to remove with a centrifuge. "Normal" steel particles have a density of about seven grams per cubic centimeter and are easily removed by a centrifuge where the separating force depends on the density difference between the particles and the carrying liquid. However, the fine particles generated in the Wire EDM cutting process become hydrolyzed and grow in size about seven times. Because of the inclusion of water, the density of these hydrolyzed steel particles is very low, on the order of 1.2 grams per cubic centimeter. Thus, there is a small density difference between these hydrolyzed particles and water, which, of course, has a density of 1.0 grams per cubic centimeter. This small difference in density makes the hydrolyzed particles very difficult to remove with a centrifuge. Studies have shown that effective clarification of Wire EDM liquids requires separation efficiencies 20 to 40 times greater than the efficiencies of known prior art centrifuges. Our invention provides centrifuges that more than satisfy the aforementioned requirement.

Prior art centrifuges have not been satisfactory for providing an adequate supply of clarified, deionized water or other liquid for many applications. For example, while U.S. Pat. No. 3,858,793 teaches a centrifuge with a separation efficiency to yield a satisfactory water clarity for Wire EDM machining, this centrifuge has a major shortcoming because it is not self-cleaning. It uses a replaceable cartridge that must be serviced manually when the cartridge has reached its capacity. Hence, this type of centrifuge is not practical for use to support Wire EDM machining.

At this time, most Wire EDMs utilize integral or associated disposable cartridge filtration systems to provide desired water clarity. None of these systems are completely satisfactory; they are expensive in terms of degrading the productivity of the machine as well as the costs of acquisition and installation of replacement filters and disposal of used filters.

U.S. Pat. No. 3,861,584 teaches a self-cleaning centrifuge but has an unsatisfactory separation of foreign matter from the carrying liquid.

SUMMARY OF THE INVENTION

While the present invention is especially advantageously applicable to the clarification of Wire EDM cutting liquids, it is not limited thereto but may be used for a wide spectrum of applications.

The present invention provides a very high efficiency centrifuge which is both self-cleaning or self-purging and has a very high capacity to clarify contaminated liquid. Our invention directly provides a significant increase in the productivity of a machining operation such as a Wire EDM; our centrifuge is thus far superior to prior art units.

In broad terms, our invention provides a self-purging centrifuge comprising a rotor assembly supported for rotation about an axis. The rotor assembly has nested first and second sets of concentric cylinders. Further, the said sets of concentric cylinders are rotatably connected, i.e., one or a "first" set is supported for rotation about the axis relative to the other or "second" set. The concentric cylinders have inner and outer collection surfaces. Means are provided for rotating one of said sets (the driving set) about the axis. Means are provided for supplying contaminated liquid to the axial end of said rotating sets of concentric cylinders. Through initial air drag, and subsequently through liquid drag, the other of said sets (the driven set) is driven at an angular velocity which closely approaches that of the driving set.

In the preferred embodiment, the rotor assembly will be supported for rotation about a vertical axis. The contaminated liquid may be supplied in the form of a spray from nozzle means against either the top or the bottom axial end of the rotor assembly.

The rotation, i.e., angular velocity, of the rotor assembly, in combination with the supply of contaminated liquid, produces a rotating vortex of the liquid and centrifugal force is thus applied to all molecules in the vortex, i.e., (1) water (or other liquid) and (2) waste or foreign matter. Foreign matter can be either of greater or lesser density than the density of the carrying liquid. Heavier foreign matter will accumulate on the inner collection surfaces of all of the rotating concentric cylinders. Lighter foreign matter (for example an oil having a relatively low density) will accumulate on the outer collection surfaces of the concentric cylinders. Concurrently with the foreign matter accumulating on the collection surfaces as aforesaid, the liquid is clarified and is collected by appropriate means into an appropriate reservoir means from which it may then be transferred for further use.

Our invention further includes means for selective and sudden/quick braking the rotation of one of the sets of concentric cylinders (relative to the other set). The braking causes the accumulated foreign matter to be sheared or sloughed off from the collection surfaces to then, under gravitational force, drop downwardly into a suitable receptacle. The braking is done at appropriate intervals of time and the interruption of the primary purpose of clarifying the contaminated liquid is minimized. All of the system control steps and functions may be automatically controlled.

Our concept includes (1) either set of concentric cylinders may be the "driver", (2) either set of concentric cylinders may be braked, (3) the same set of concentric cylinders may both be the "driver" and also be braked, and (4) the "feed" of contaminated liquid may be to either of the axial ends of the rotary assembly of nested concentric cylinders.

DESCRIPTION OF THE DRAWING

FIG. 2 shows an exploded view of the shaft means which includes a stationary shaft and additional shaft means connected respectively to the first and second sets of concentric cylinders;

FIG. 3 shows the apparatus as shown in FIG. 2 in assembled form and on an enlarged scale;

FIG. 4 shows the apparatus of FIG. 3 assembled with (for this exploded view) axially spaced-apart first and second sets of concentric cylinders;

FIG. 5 is an end view of the apparatus of FIG. 4 as viewed along section lines 5—5 of FIG. 4; FIG. 5 is thus a plan view of an end plate means or lower cylinder drive plate for the lower set of concentric cylinders as shown in FIG. 4;

FIG. 6 is an exterior view of the top of the upper set of concentric cylinders;

FIG. 7 is a cross-section of one embodiment of our invention;

FIG. 8 is a plan view of the bottom or underside of a bowl cover plate used with the apparatus shown in and as viewed along section lines 8—8 of FIG. 9;

FIG. 9 is a cross-sectional view of the cover of FIG. 8 as viewed along section lines 9—9 thereof;

FIG. 10 is a cross-sectional view of a portion of the cover of FIG. 9 as viewed along section lines 10—10 thereof;

FIG. 14 is a somewhat schematic cross-section of an alternate embodiment of our invention.

DETAILED DESCRIPTION OF THE INVENTION

Figure 1:
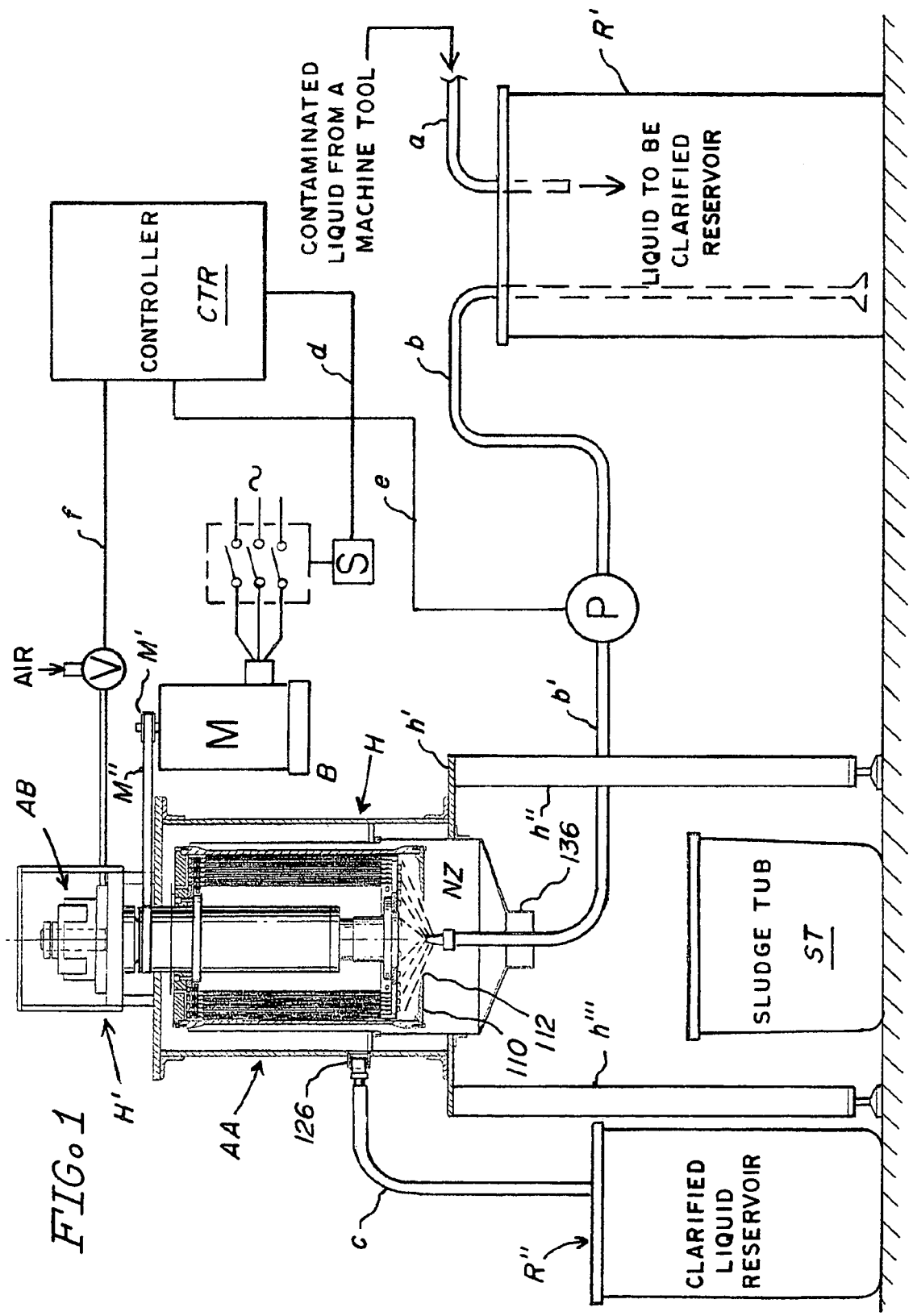
FIG. 1 shows a schematic diagram of our invention in a representative system application for clarifying contaminated liquid.

In FIG. 1 the preferred embodiments of our invention is identified as the centrifuge AA comprising, in part, a housing H having a base or centrifuge support means h' including legs h" and h'". The centrifuge AA is shown in much greater detail in FIG. 7. A motor means M is shown in FIG. 1 having a drive pulley M' connected via a drive belt means M" to the top of the centrifuge AA, adjacent to which is a selectively controlled brake means AB. Rotation of the motor means causes the rotation of the nested sets of concentric cylinders. Integral with the main housing H is an upper or auxiliary housing enclosure H' (best shown in FIG. 7) to include a plate member 26 connected to a short support 24 by screw means 26'. The support 24 is attached by means not shown to top plate 22 of housing H.

Contaminated liquid from a source such as a machine tool is delivered by a conduit a to a reservoir R'. The contaminated liquid may be selectively sprayed against the underside or bottom axial end of the rotor assembly, i.e., the rotating nested sets of concentric cylinders. The contaminated liquid is pumped by a pump means P from the reservoir R' via conduits b and b' to nozzle means NZ. The foreign matter in the liquid will be collected on the collection surfaces of the concentric cylinders and the liquid, now clarified, will be collected within the housing H for transfer, via a drain means 126 and a conduit c, to a clarified liquid reservoir R". Typically, the clarified liquid in reservoir R" would, by means including conduit means not shown, be returned to the original machine tool to be used again, and again The motor depicted is electrically energized by a controllable switch means S which in turn is controlled via a connection d by a controller CTR which also controls, via connection e, the pump P and, via connection f, a valve means V for selective actuation of the brake means AB. When the brake means is actuated to brake the rotation of one of the sets of concentric cylinders, then the accumulated foreign matter will slough off, as described above, and drop down through an opening 136 at the bottom of the centrifuge and thence into an appropriate receiving means depicted as a "sludge tub" ST.

Figure 4A:
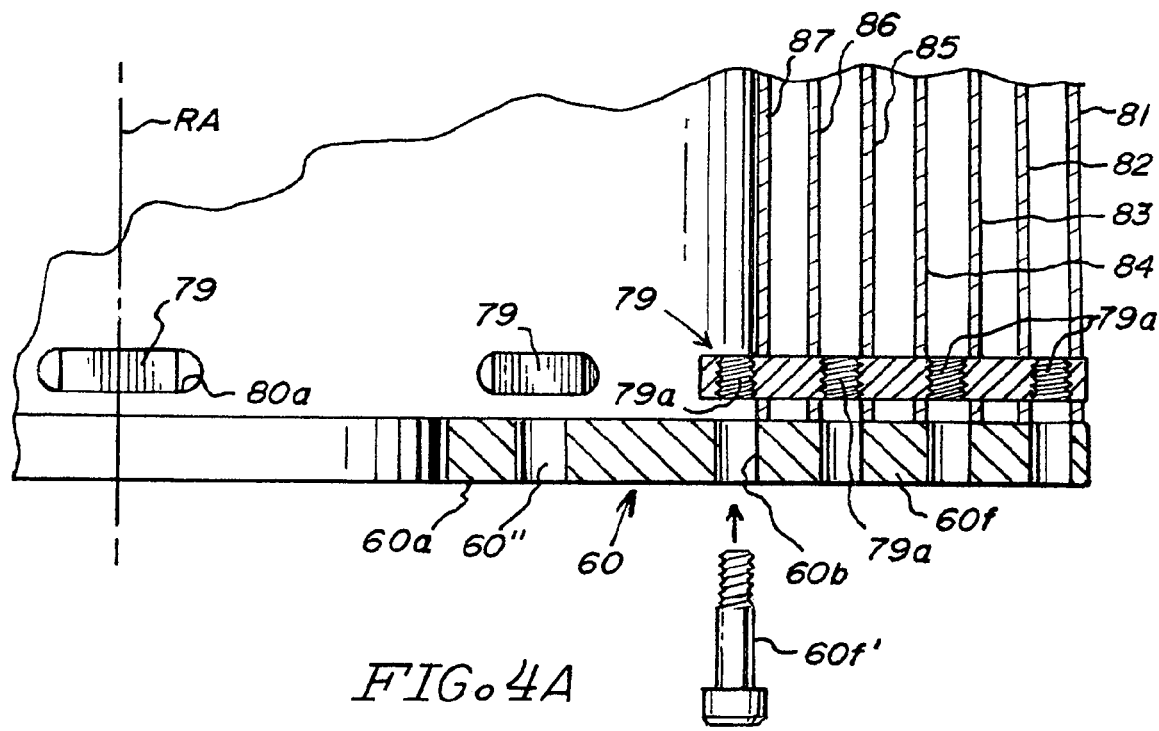
FIG. 4A is a view, on an enlarged scale, of a portion of the set of lower concentric cylinders as shown in FIG. 4.

FIG. 1, FIG. 4, and FIG. 7 show a rotor assembly supported for rotation about an axis, the rotor assembly having a first set and a second set of nested cylinders, according to some embodiments of the invention. Each set of cylinders includes a plurality of concentric cylinders, each cylinder having one or more openings at a first end and one or more openings at an opposite second end. The cylinders define a plurality of concentric liquid passageways configured for parallel unidirectional flow of the liquids through the plurality of concentric liquid passageways.

FIG. 2 shows, in broad terms, a hollow stationary shaft means 30, a hollow driving shaft means 50, and a solid driven shaft means 40 which, when assembled, form a unitary assembly BB as shown in FIGS. 3 and 4. These elements are coaxial with respect to the centrifuge rotational axis RA Hollow stationary shaft means 30 comprises an elongated tube 34 having an inner surface 34', external thread means 34a at the bottom thereof, a radially extending flange 32 at the top thereof, and a recess 32a adapted to receive the outer race of a bearing means 36. An internally threaded collet 38 is shown adjacent to bearing means 36 in FIG. 2 and is adapted to be screwed onto a threaded means 38' on solid shaft 40 when the shafts 30, 40 and 50 are assembled as is shown in FIG. 3. At that time the collet 38 will bear against the inner race of the bearing means 36. The flange 32 has a plurality of threaded bores 32' for receiving the threaded ends of bolt means 26" which extend through bores in the member 26 of the housing H' as shown in FIG. 7 so as to firmly attach or connect the assembly BB to the housing H. Adjacent to the flange 32 is a circumferential surface 35a on the tube 34 which is sized to receive the inner race of a bearing means 35, the outer race of which is adapted to be received by a recess 35b in the top end of the hollow driving shaft means 50 which, as shown, is an elongated tube 52.

The bottom annular end 53 of tube 52 has a plurality of circumferentially spaced-apart threaded bores 53' extending parallel to the axis RA. A flange 54, having a plurality of axial bores 54', extends radially from tube 52 to provide a means for attaching tube 52 to the upper or first set 70 of concentric cylinders thereto as is best shown in FIG. 7. The bottom annular end of tube 52 also has a series of stepped recesses 55 and 56 for receiving, respectively, bearing means 55a and 56a as shown in FIG. 3. A collet 57a is adapted to hold bearing means 56a in recess 56 via a plurality of bolt means 57a' screwed into the threaded bores 53'. The bearing means 55a also is held in the-recess 55 by collet 34b which has internal threaded means for engagement with the threaded end 34a on the bottom end of the stationary hollow shaft means 34.

The solid shaft means 40 is elongated and has a top portion 40a adapted to be selectively gripped by the brake means (to be described below) and a lower or bottom end 40b to which is connected a hub member 42 having a radially extending flange 44 and an end cap 46 sized to fit into the center opening 60' of end plate 60 (to be discussed below). The flange 44 has a plurality of threaded bores 44' for receiving bolt means 44" when the end plate 60 is attached to the bottom of shaft 40.

Thus, a compound rotatable support means is provided for the rotor assembly. Our invention provides (1) a rotatable support of a first set of concentric cylinders 70 relative to the stationary hollow shaft means 34 (and thus the housing H), and (2) the rotatable support of the second set of concentric cylinders 80 relative to the first set 70, such rotatable support being best illustrated in FIG. 3.

Shaft means 34 positions the outer race of bearing means 36, the inner race of which positions the top end 40a of the solid shaft 40. The hollow shaft 50 is supported (by shaft means 34) in an axial sense and for rotation about axis RA by upper bearing means 35 and lower bearing means 55a. Further, the solid shaft 40 is supported (both in a rotational and an axial sense) by the hollow shaft 50 via the bearing means 56a, the inner race of which journals the lower portion 40b of the solid shaft 40.

The first and second sets of concentric cylinders 70 and 80 respectively are shown in pre-assembled axially-spaced apart relationship in FIG. 4. Each of sets 70 and 80 is shown to have seven concentric cylinders. Set 70 has cylinders 71, 72, 73, 74, 75, 76 and 77 with cylinder 71 having the largest diameter and with the diameters decreasing in steps to cylinder 77 the smallest diameter. Likewise, set 80 has cylinders 81, 82, 83, 84, 85, 86 and 87 with cylinders 81 and 87 having the largest and smallest diameters, the intermediate cylinders having diameters decreasing in uniform steps.

Each of the cylinders has, near one end thereof, a plurality of circumferentially elongated slots therethrough which are used in combination with radially extending bar means to attach all of the cylinders of a set to an end plate means. Thus, the set 80 has a plurality of such shaped slots 80a positioned circumferentially about the lower end of the concentric cylinders 81–87 of the set. Elongated bars 79 are positioned in slots 80a of all of the concentric cylinders and thus are radially oriented. The bars 79 are sized to fit snugly in slots 80a. In addition, the elongated bars 79 have a plurality of threaded bores 79a for receiving the threaded ends of bolt means 60f, as hereinafter explained. An end plate or lower cylinder drive plate 60 shown in FIGS. 4, 4A and 5 has an annular section 60a with a central circular opening 60' sized to receive the hub 46 of shaft 40. Adjacent to the edge of the opening 60' are a plurality of bores 60" in annular section 60a for passage therethrough of machine screw means 44" to be screwed into threaded bores 44' of flange 44 to thus attach end plate 60 to flange 44 of shaft 40.

The end plate 60 further includes a spider-like plurality of radially extending spokes or fingers 60f each having a plurality of radially arranged, axially extending bores 60b for passage therethrough of a plurality of attachment means 60f' which have at their upper ends thread means for engaging the aforementioned threaded bores 79a in the bars 79. As shown in FIG. 5, the end plate 60 has eight spokes or fingers 60f with approximately 45 degrees of spacing between adjacent spokes; the number and angular spacing of spokes should match the number and be in register with the angular spacing of the bars. The number of spokes and co-acting bars can be greater or less than the eight shown. The purpose of the end plate is, in combination with the elongated bars, to provide a strong, solid connection means for attachment of the concentric cylinders to the flange 44 and thus to the solid (driven) shaft 40. In practice, the plurality of concentric cylinders 81–87 are arranged in the order shown in FIG. 4; and the fastening means 60f' are inserted through bores 60b and threaded tight into the threaded bores 79a of the bars 79. The cylinders are sized in thickness and of selected material for functioning in a rotor assembly rotating at high angular velocities. We have found 16 gauge stainless steel to be satisfactory. However, it should be understood that other materials and other thicknesses may be used. In general, it is advantageous to use thin material for the cylinders to enjoy improved separation efficiencies and reduced size of the centrifuge. The spacing between the cylinders (of the nested sets) is nominally a target of 0.08 inches; this target may, of course, be varied.

Figure 11:
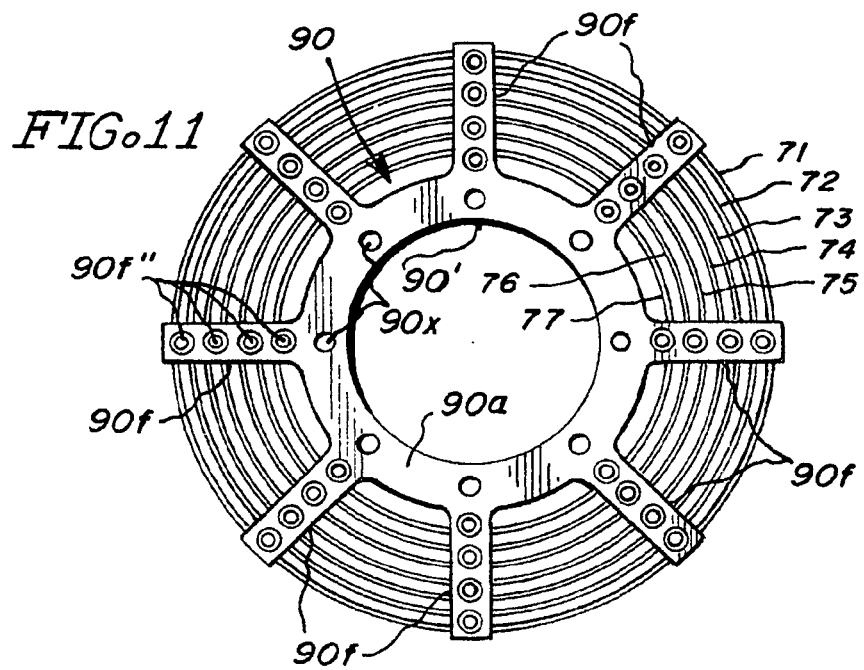
FIG. 11 is a plan view or view of the top surface of an upper cylinder mounting plate as viewed along section lines 11—11 of FIG. 4.
Figure 12:
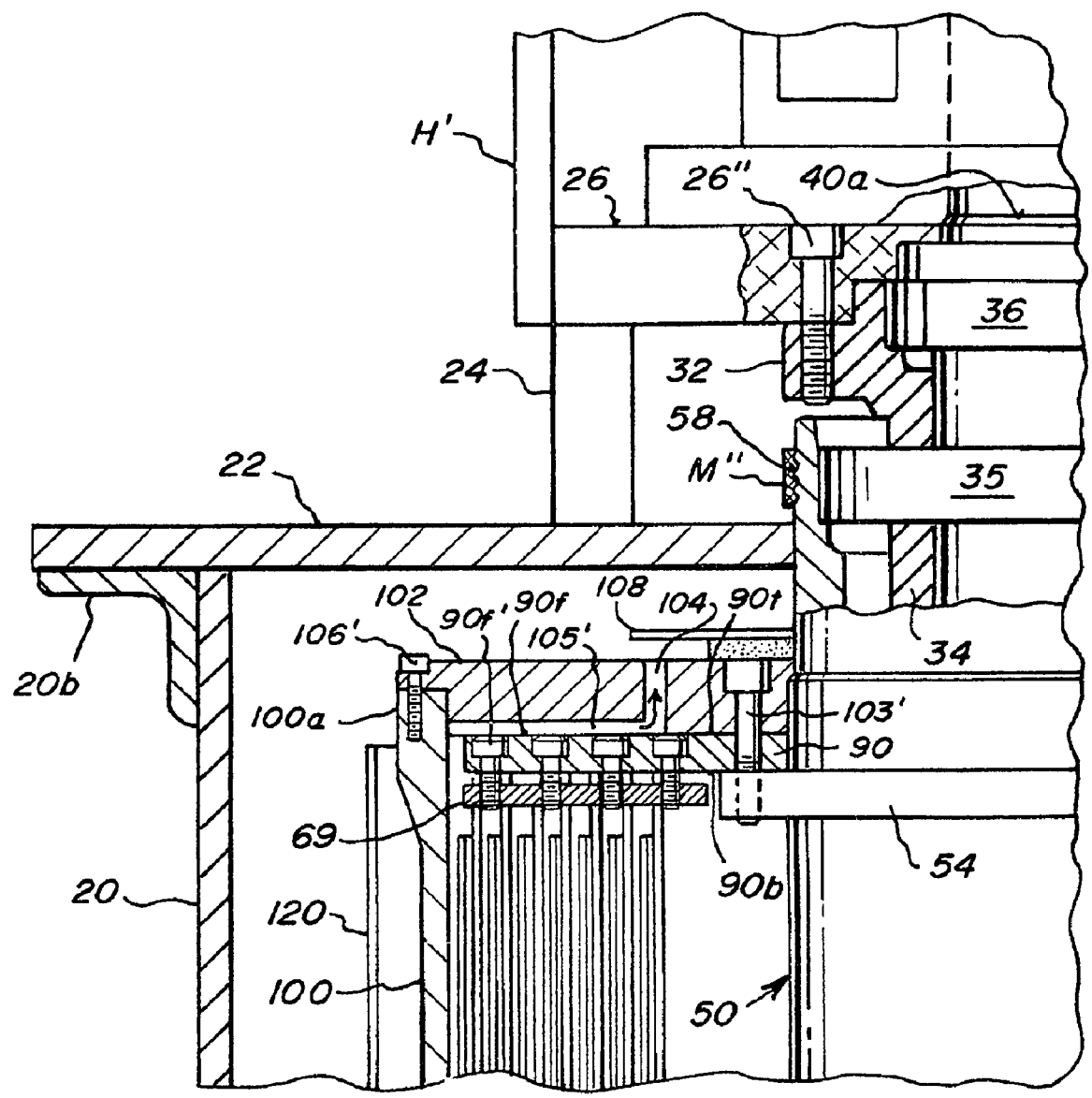
FIG. 12 is an enlarged view (from FIG. 7) of a section of the top of the nested concentric cylinders in assembled relationship with the bowl cover shown in FIGS. 8,9 and 10.

The upper set of concentric cylinders 70 has an associated upper cylinder mounting plate or end plate 90 (shown best in FIGS. 11 and 12) which is quite similar to end plate 60 with, again, eight spider-like spokes or fingers 90f extending radially from an annular center section 90a, an exception being that the radially spaced-apart, axially extending bores 90f" through the spokes 90f are counter-bored (see FIG. 12) so that the heads of bolt means 90f', when assembled, do not project above the top surface 90t of the end plate 90 as is shown in FIG. 4. The bolt means 90f' pass through the bores 90f" and are screwed into threaded bores in elongated bar means 69 which are positioned through circumferentially elongated slots 70a as is clearly shown in FIG. 4. Thus the top surface 90t of end plate 90 (as viewed in FIGS. 4 and 7) is planar which is required because it is abutted by the bottom planar surface 102b of a bowl cover 102 shown in FIGS. 7–10. End plate 90 has a central circular opening 90' sized for receiving the driving shaft 50 and, as shown in FIGS. 4 and 7, the bottom surface 90b of end plate 90 is abutted by the top surface of flange 54 of shaft 50. End plate 90 also has, adjacent to the center opening 90', a plurality of bores 90x arranged in a circle and positioned sufficiently radially from the axis RA to permit bolts 103' to pass through for threaded engagement with threaded bores 54' in flange 54.

The bowl cover 102 is a flat, annular member having a central opening 102', a plurality of axial bores 103 arranged in a circle adjacent to opening 102', and a plurality of axial bores 104 arranged in a circle at a pre-selected distance from the axis RA. Bores 103 facilitate the attachment of the bowl cover to shaft 50. Bores 104 are ports for the passage of clarified fluid as will be discussed below. A plurality of U-shaped channels 105 are provided on the bottom surface 102b of bowl cover 102 and extend radially from the bores 104 to the outer periphery of the cover as is best shown in FIGS. 8–10. FIG. 8 shows eight channels 105 arranged uniformly about the axis RA. The outer periphery of the bowl cover has a flange means 102f through which extend a plurality of bores 106. The number of channels 105 (and bores 104) must equal the number of spokes 90*f*. The spokes 90*f* have a width greater than the width of the channels 105 and the end plate 90 is assembled with the bowl cover 102 with the spokes 90*f* in overlapping register with the channels 105 (see FIG. 10) to form liquid passageways for the clarified liquid as will be explained below.

The bowl cover 102 is one of the component parts of a bowl B; it is connected to the top 100*a* of a vertically oriented elongated outer cylinder or bowl body 100 by bolt means 106' passing through bores 106 and screwed into threaded bores around the top 100*a* as is shown in FIG. 7. The bottom 100*b* of the cylinder 100 has attached thereto by bolt means 114 an annular end plate member 110 having a large central opening 112.

A plurality of bolt means 103' extend through bores 103 in bowl cover 102, thence through bores in end plate 90 and are screwed into threaded bores 54' of flange 54 as is clearly shown in FIG. 7 to thus couple the bowl B and the upper set 70 of concentric cylinders to the hollow drive shaft means 50 which, as indicated, is supported for rotation about the axis RA by the stationary shaft 30 and bearings 35 and 55*a*. Concurrently, the lower set 80 of concentric cylinders is nested (spaced from and proximate to) with the upper set 70 and the shaft 40 thereof is supported by shaft 50 and with bearing 56*a* and stationary hollow shaft 30 with bearing 36 for rotation about the axis RA with respect to the upper set 70.

An annularly shaped liquid splash plate means 108, positioned adjacent to and slightly above the ports 104 (see FIG. 7), is connected to rotate with the bowl B.

A short axial portion 58 on the outer surface on the top of hollow shaft means 50 is adapted for engagement with a drive belt-type means M" driven by motor means M. Thus, when motor M is energized, the drive belt-type means M" will apply torque to tend to rotate shaft 50 and the upper set 70 of concentric cylinders. The "load" or torque requirements on motor M at starting are relatively low; thus, a relatively low power motor can be used with our invention. The set of concentric cylinders 70 will begin to rotate and eventually will be rotated at a pre-selected angular velocity determined by that of the motor and the diameters of M' and 58. The lower or driven set of concentric cylinders 80 may receive some rotational torque via air rotated by set 70. Typically, when motor M is energized, the system operator or automatic control system would concurrently actuate pump P to pump contaminated liquid CL via conduit b' to nozzle means NZ to spray the contaminated liquid CL against the bottom axial ends of the nested concentric cylinders. As soon as the droplets of the liquid contact the rotating cylinders of the upper set 70 the said droplets are subject to centrifugal force and tend to move outwardly toward the inside surfaces of each of the rotating cylinders and, eventually, to the inside surface of the bowl cylinder 100 to initiate the formation of a toroidal-shaped body of contaminated liquid. The liquid may move outwardly by flowing from the axial ends of the cylinders in the spaces between the spokes 60*f* and 90*f* respectively of the end plates 60 and 90 (see FIGS. 5 and 11). The introduction of the sprayed contaminated liquid CL greatly increases the coupling coefficient between the driving set 70 and the driven set 80 and, in due course, the driven set 80 will have an angular velocity very close to that of the driving set 70. A typical angular velocity for the driving set 80 is 3600 RPM which has been found to be satisfactory. However faster or slower speeds may be used.

For the case where the foreign material has a density greater than that of the carrying liquid (this is the case for most industrial contaminated liquid scenarios), the foreign material will accumulate on the inner surfaces of the concentric cylinders of both the upper and lower sets in a continuous process which results in the carrying liquid being clarified. However, if the foreign material is lighter than the carrying liquid, the foreign material will accumulate on the outer surfaces of the nested cylinders.

The rotating toroidal-shaped body of clarified liquid will increase in radial depth or extent as more and more contaminated liquid is sprayed against the axial end of the nested sets, growing in size (radial extent) starting with the outer cylindrical surface thereof abutting the inner cylindrical surface of the bowl cylinder 100 and with the inner circumferential surface of the toroid growing, i.e., moving toward the rotational axis RA. The aforesaid radial growth of the toroid continues until said inner cylindrical surface thereof is slightly closer to the axis RA than the plurality of ports 104 in bowl cover 102 whereupon a pressure differential is created which forces the clarified liquid to flow from the top of the inner surface of bowl cylinder 100 into the passageways formed by channels 105 and spokes 90*f* (see FIG. 10) and thence radially inward in said passageways to and through and out the axially oriented bores 104. Thus the clarified liquid is expelled under pressure out of bores 104 of bowl cover 102 whereat such liquid will tend to travel radially toward the inside cylindrical surface 20*x* of the housing H. The expelled clarified liquid may impact the splash plate means 108 as it travels toward surface 20*x*. Under the centrifugal force of the rotating assembly, the clarified liquid expelled from ports or bores 104 will be transferred to a clarified liquid collection means. For the embodiment of our invention shown in FIG. 7, the clarified liquid collection means is the annular space 124 defined between housing 20 and inner cylinder 120 with annular member 122 providing a bottom member for the collection means. Means including a fitting 126 and conduit means c permit the draining or transferring of clarified liquid from the collection means into a clarified liquid reservoir R" shown in FIG. 1.

Our invention further includes means for selectively braking the rotation of one of the sets of concentric cylinders with respect to the other set. Such braking should be as "sudden" or quickly as can be reasonably be accomplished because a quick braking maximizes the purging action. The braking is done from time to time, the frequency of braking being determined by the build up of foreign matter on the collection surfaces of all of the concentric cylinders in contact with the contaminated liquid. As indicated, the braking may be applied to either the driving or the driven set of cylinders. The arrangement shown in FIG. 7 has the braking applied to the driven set 80 of concentric cylinders. Again, it is desirable to have the rotation stopped quickly so as to maximize the purging efficiency. As depicted, the driven set 80 has less rotational inertia than that of the driving set 70. Thus, for a given level of braking torque, the driven set 80 may be braked quicker than the driving set 70.

The sudden braking of the driven set 80 is caused by actuation of a brake means AB mounted on the top of plate 26 of the housing and fitted with a controllable shaft clamping means adjacent to the top axial portion 40*a* of the solid shaft 40 to which the driven set 70 of concentric cylinders are connected. Various braking means may be used for this purpose. The brake AB is depicted as an air operated brake. One brake which has been found to be satisfactory is Model S-800 sold by Nexen Group, Inc. Another variable or choice is to have a brake-clutch linkage (not shown) as part of the drive means between the motor M and the rotatable assembly of nested concentric cylinders.

Figure 13:
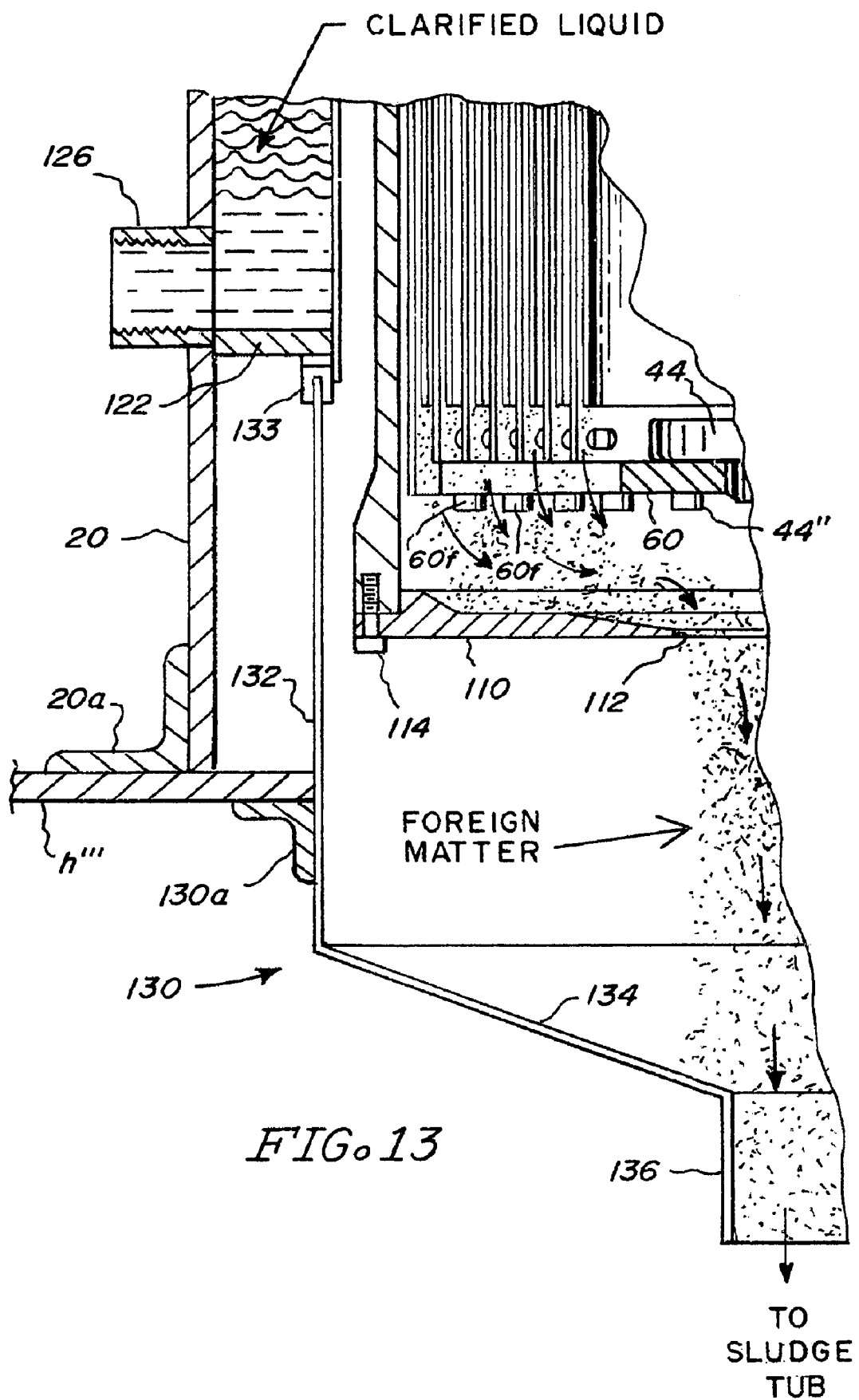
FIG. 13 is an enlarged view (from FIG. 7) of a section of the bottom of the nested concentric cylinders showing (following the braking of one of the sets of rotating concentric cylinders) the sloughed off or dislodged "foreign matter" in transit to the sludge tub ST.

The sudden braking provides the very important function of purging the foreign matter from the collection surfaces of the nested concentric cylinders. The rapid changing of angular velocities between the driving and driven cylinders produces a shearing-like or sloughing-like force on the accumulated foreign matter to thereby separate same from all collection surfaces (except the inside surface of cylinder 77) following which the foreign matter falls under gravitational force down through the opening 112 and exit 136 into a sludge tub ST or equivalent as shown in FIG. 13.

Another embodiment of our invention is shown, somewhat schematically, in FIG. 14 where three centrifuges (each illustrating the embodiment) I, II, and III are mounted on a frame FR in side-by-side relationship and are positioned over a common open-topped reservoir R''' for the collection of clarified liquid. It should be noted that the three centrifuges do not have a formal or defined housing surrounding the rotating bowl assemblies B', B'' and B''' as was the case for the FIG. 7 embodiment. Each of the centrifuges has a shroud or umbrella means which deflects clarified liquid ejected in the manner above described out of the bores 104 of the bowl cover plate. Thus shroud or umbrella means U', U'' and U''' are provided above bowl assemblies B', B'' and B''' and function to capture and direct the clarified liquid to the clarified liquid reservoir R'''.

While we have described in considerable detail two embodiments of our invention, others skilled in the art may provide modifications or variations of our apparatus. In particular it should be understood that our concept is specifically intended to cover nested first and second sets of concentric cylinders where (a) either set may be the driver with the other set being the driven set, (b) either set may be braked, (c) the same set of cylinders may be the "driver" and may be braked, and (d) the feed of contaminated liquid may be provided to either (or both) axial ends of the sets of concentric cylinders. In short, the scope of our invention should be measured only by the following claims.

The invention claimed is:

1. A self-cleaning centrifuge for clarifying contaminated liquids comprising:
   a rotor assembly supported for rotation about an axis, the rotor assembly having a first set and a second set of nested cylinders, each set having a plurality of concentric cylinders, wherein the first set and the second set are both supported for rotation and supported for rotation relative to each other, each cylinder having one or more openings at a first end of the nested cylinders and one or more openings at an opposite second end of the nested cylinders, the cylinders defining a plurality of concentric liquid passageways configured for parallel unidirectional flow of the liquids from the openings at the first end of the nested cylinders through the plurality of concentric liquid passageways to the openings at the second end of the nested cylinders.

2. The centrifuge of claim 1, wherein the first end and second end of the sets of nested cylinders are spaced from respective first and second end walls of the rotor assembly such that the plurality of concentric liquid passages extend from between the plurality of concentric cylinders in a radial manner and in an axial manner at a top and bottom of each cylinder.

3. The centrifuge of claim 1, wherein one of the sets is rotatably supported by the other of the sets, and wherein the cylinders have waste-matter collection surfaces, in order that the plurality of cylinders provide a high-efficiency self-cleaning centrifuge.

4. The centrifuge of claim 1, further comprising:
   a brake operatively coupled to the first set of concentric cylinders to selectively brake the rotation of the first set relative to the second set;
   a bowl body operatively coupled to the rotor assembly and connected to one of the sets of cylinders, the bowl body having one or more bottom-positioned openings adapted to facilitate a passage of accumulated waste matter when the brake is applied;
   a tube operatively coupled to supply the contaminated liquid to one end of the plurality of concentric liquid passages;
   a sludge collection system operatively coupled to receive purged waste from the self-cleaning centrifuge upon application of the brake;
   a clarified-liquid collection system operatively coupled to receive clarified liquid from an upper end of the bowl body during operation of the self-cleaning centrifuge;
   a motor operatively coupled to rotate the plurality of concentric cylinders about the axis; and
   a frame operatively coupled to support the rotor assembly and the bowl body.

5. The centrifuge of claim 1, further comprising a machine tool that uses a liquid to remove debris, the liquid and debris providing at least a portion of the contaminated liquids.

6. The centrifuge of claim 1, wherein every other cylinder is from one set of the nested cylinders.

7. A self-cleaning centrifuge for clarifying contaminated liquids comprising:
   a rotor assembly supported for rotation about an axis, the rotor assembly having a first set and a second set of nested cylinders each having a plurality of concentric cylinders, each cylinder having one or more openings at a first end and one or more openings at an opposite second end, the cylinders defining a plurality of concentric liquid passageways configured for parallel unidirectional flow of the liquids through the plurality of concentric liquid passageways; and
   a brake operatively coupled to the first set of concentric cylinders to selectively brake the rotation of the first set relative to the second set.

8. The centrifuge of claim 7, further comprising a bowl body operatively coupled to the rotor assembly and connected to one of the sets of cylinders, the bowl body having one or more bottom-positioned openings adapted to facilitate a passage of accumulated waste matter when the brake is applied.

9. The centrifuge of claim 8, further comprising:
   a sludge receptacle operatively coupled to receive purged waste from the self-cleaning centrifuge upon application of the brake; and
   a clarified-liquid collection system operatively coupled to receive clarified liquid from an upper end of the bowl body during operation of the self-cleaning centrifuge.

10. The centrifuge of claim 8, further comprising:
   a nozzle operatively coupled to supply the contaminated liquid to the plurality of concentric passages;
   a motor operatively coupled to rotate the plurality of concentric cylinders about the axis; and
   a housing operatively coupled to hold the rotor assembly and the bowl body.

11. A method comprising:
   providing a centrifuge for clarifying contaminated liquids, the centrifuge including a rotor assembly supported for rotation about an axis, the rotor assembly having at least a first set and a second set of nested cylinders, each set having a plurality of concentric cylinders, wherein the first set and the second set are both supported for rotation and supported for rotation relative to each other, each cylinder having one or more openings at a first end of the nested cylinders and one or more openings at an opposite second end of the nested cylinders, the cylinders defining a plurality of concentric liquid passageways;

supplying, at the first end of the nested cylinders, a liquid having components to be separated; and rotationally centrifuging the liquid using a unidirectional parallel concentric flow from the openings at the first end of the nested cylinders, through the plurality of nested concentric cylindrical passageways, to the openings at the second end of the nested cylinders.

12. The method of claim 11, wherein the passing of the liquid includes introducing contaminated liquid in a radial manner at the first end of the nested concentric passageways and removing clarified liquid at the second end of the nested concentric passageways.

13. The method of claim 11, further comprising selectively braking the first set of concentric cylinders in order to purge accumulated waste from at least one of the surfaces of the first set of nested concentric cylinders.

14. The method of claim 13, further comprising:

providing a bowl body surrounding the first set of nested concentric cylinders, the bowl body having an opening on the bottom of the bowl body; and passing the purged accumulated waste through the opening on the bottom of the bowl.

15. The method of claim 11, wherein the passing of the liquid includes:

supplying contaminated liquid at a lower end of the plurality of nested concentric cylindrical passageways; and removing clarified liquid from an upper end of the plurality of nested concentric cylindrical passageways.

16. An apparatus comprising:

means for rotationally centrifuging liquid about an axis in a unidirectional parallel concentric flow in an upward direction through a plurality of substantially vertical nested concentric cylindrical passageways from openings at a bottom end of the nested cylinders to openings at an opposite top end of the nested cylinders, said means including a rotor assembly with a first cylinder set and a second cylinder set that are both supported for rotation and supported for rotation relative to each other.

17. The apparatus of claim 16, wherein each said set of nested cylinders has one or more concentric cylinders each cylinder having means for removing accumulated waste sludge at the bottom end and means for removing clarified fluid at the top end, the cylinders defining the plurality of nested concentric cylindrical passageways configured for parallel unidirectional flow of the liquid.

18. The apparatus of claim 17, wherein the means for removing accumulated waste sludge include:

said openings at the bottom end of each cylinder; and means for selectively braking the first set of concentric cylinders to loosen the sludge from the cylinders in order to have the sludge fall through the one or more openings at the bottom end of each cylinder.

19. The apparatus of claim 17, further comprising means for rotating the first set and the second set of nested concentric cylinders about the axis; and means for rotatably connecting the plurality of concentric cylinders to the means for rotating.

20. The apparatus of claim 17, further comprising:

means for containing the liquid around the sets of concentric cylinders during the rotationally centrifuging liquid about the axis, and wherein the means for removing accumulated waste sludge further includes means for emptying the means for containing the liquid.

21. The apparatus of claim 16, further comprising:

means for supplying contaminated liquid into the means for centrifuging;

means for controlling the supplying of contaminated liquid to the rotor assembly;

means for collecting accumulated waste matter; and means for collecting clarified liquid.

22. The apparatus of claim 16, wherein each said set of nested cylinders has one or more concentric cylinders such that every other cylinder is from one set, each set having means for removing accumulated waste sludge at its bottom end, the sets of cylinders defining the plurality of nested concentric cylindrical passageways configured for parallel unidirectional flow of the liquid.

* * * * *

UNITED STATES PATENT AND TRADEMARK OFFICE
CERTIFICATE OF CORRECTION

PATENT NO.        : 7,077,799 B2                                          Page 1 of 1
APPLICATION NO.   : 10/724432
DATED             : July 18, 2006
INVENTOR(S)       : Adelbert Gorham et al.

It is certified that error appears in the above-identified patent and that said Letters Patent is hereby corrected as shown below:

In the TITLE:   Delete "CONCENTRATE" and insert --CONCENTRIC-- therefor.

In Column 12, Line 6 (line 2 of claim 17):   Add a comma after "concentric cylinders" and before "each" so that Column 12, Line 6 reads: --nested cylinders has one or more concentric cylinders, each--.

Signed and Sealed this

Tenth Day of October, 2006

JON W. DUDAS
*Director of the United States Patent and Trademark Office*